(12) United States Patent
Nishimura

(10) Patent No.: US 7,315,397 B2
(45) Date of Patent: Jan. 1, 2008

(54) IMAGE PROCESSING WITH CONVERSION OF NON-LINEAR TO LINEAR CONVERSION

(75) Inventor: Naoki Nishimura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 802 days.

(21) Appl. No.: 10/732,403

(22) Filed: Dec. 11, 2003

(65) Prior Publication Data
US 2004/0120573 A1 Jun. 24, 2004

(30) Foreign Application Priority Data
Dec. 16, 2002 (JP) .............................. 2002-364329

(51) Int. Cl.
*H04N 1/40* (2006.01)
(52) U.S. Cl. .................. 358/1.9; 358/2.1; 358/504
(58) Field of Classification Search .................. 358/1.9, 358/2.1, 500, 502, 504, 468, 518, 527; 345/589–590
See application file for complete search history.

(56) References Cited

U.S. PATENT DOCUMENTS 5,731,818 A * 3/1998 Wan et al. .................. 345/590
6,388,674 B1 * 5/2002 Ito et al. ..................... 345/590
6,882,445 B1 * 4/2005 Takahashi et al. ........... 358/1.9
7,015,927 B2 * 3/2006 Matsushiro et al. ........ 345/600

* cited by examiner

*Primary Examiner*—Thomas R. Lee
*Assistant Examiner*—Stephen Brinich
(74) *Attorney, Agent, or Firm*—Fitzpatrick, Cella, Harper & Scinto

(57) ABSTRACT

When an input color signal of a first color space is converted to a color signal of a second color space having a color reproduction range narrower than that of the first color space, it is determined whether a color signal that is outside the color reproduction range of the second color space having the color reproduction range narrower than that of the first color space exists within the input color signal of the first color space. If it has been determined that a color signal outside the color reproduction range of the second color space exists, the hue system of the color signal represented in the first color space is converted to the hue system of the color signal represented in the second color space having the narrower color reproduction range.

10 Claims, 7 Drawing Sheets

IMAGE PROCESSING WITH CONVERSION OF NON-LINEAR TO LINEAR CONVERSION

FIELD OF THE INVENTION

This invention relates to a technique for converting an input color signal of a first color space to a color signal of a second color space having a narrower color reproduction range.

BACKGROUND OF THE INVENTION

Monitors and printers (hard copiers) and the like are examples of devices that output color data. Monitors express color by additive mixing of color stimuli and hard copiers express color by negative mixing of color stimuli.

In general, a monitor has a color reproduction range that is wider than that of a hard copier and therefore an image displayed by a monitor cannot be reproduced faithfully by a hard copier.

Color-space compression methods are available as a technique for achieving visual matching of colors. These methods include the following:

(1) a method of linearly mapping the entire range of color reproduction;

(2) a method of compressing only color that is outside the color reproduction range to the fringe of the color reproduction range; and (3) a method of maintaining tonality by compressing color that is outside the color reproduction range to the high-saturation portion of the color reproduction range without performing compression, to the greatest extent possible, within the color reproduction range in order to maintain the original colors.

With method (1), mapping is performed linearly and therefore tonality is not sacrificed. However, this method can give rise to colors that appear different visually.

In accordance with method (2), two points outside the color reproduction range are mapped to the same positions on the fringe of the color reproduction range. Tonality deteriorates and information possessed by the image is lost.

With method (3), tonality is not lost and the original color is preserved in relation to portions of low saturation. Accordingly, this method provides a color image that is most natural to human vision and is used in outputting photographs and the like.

With method (3), however, up to what point within a color reproduction range a color outside the color reproduction range is to be compressed is not defined and it is particularly difficult to set the compressing unit in terms of saturation.

Accordingly, heretofore attention has been directed toward the fact that the method adopted is to perform the conversion in such a manner that the hue of a color signal before color conversion and the hue of a color signal after color conversion will not differ, and therefore the conventional approach is to perform a non-linear mapping taking only a single hue into consideration. With this method, however, the balance between mutually adjacent hues cannot be changed and the hue of a color signal in a first color space cannot be converted linearly to the hue of a color signal in a second color space having a narrower color-space volume.

Further, when a color whose color-reproduction area is greater than that of a monitor is input, compression cannot be performed in optimum fashion based upon a method of color-space compression from the monitor to a hard copier.

SUMMARY OF THE INVENTION

Accordingly, an object of the present invention is to execute color-space compression processing based upon the characteristics of human vision and effect a conversion to a color signal representing a color having an appearance close to a color expressed by an input color signal.

According to the present invention, the foregoing object is attained by providing an image processing method for converting an input color signal of a first color space to a color signal of a second color space having a color reproduction range narrower than that of the first color space, comprising: a discriminating step of discriminating whether a color signal that is outside the color reproduction range of the second color space having the color reproduction range narrower than that of the first color space exists within the input color signal of the first color space; and a color converting step of converting the hue system of the color signal represented in the first color space to the hue system of the color signal represented in the second color space having the narrower color reproduction range in a case where it has been discriminated at the discriminating step that a color signal outside the color reproduction range of the second color space exists.

According to another aspect of the present invention, the foregoing object is attained by providing an image processing apparatus for converting an input color signal of a first color space to a color signal of a second color space having a color reproduction range narrower than that of the first color space, comprising: discriminating means for discriminating whether a color signal that is outside the color reproduction range of the second color space having the color reproduction range narrower than that of the first color space exists within the input color signal of the first color space; and color converting means for converting the hue system of the color signal represented in the first color space to the hue system of the color signal represented in the second color space having the narrower color reproduction range in a case where it has been discriminated by the discriminating means that a color signal outside the color reproduction range of the second color space exists.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

An embodiment of the present invention will now be described in detail with reference to the drawings.

Figure 1:
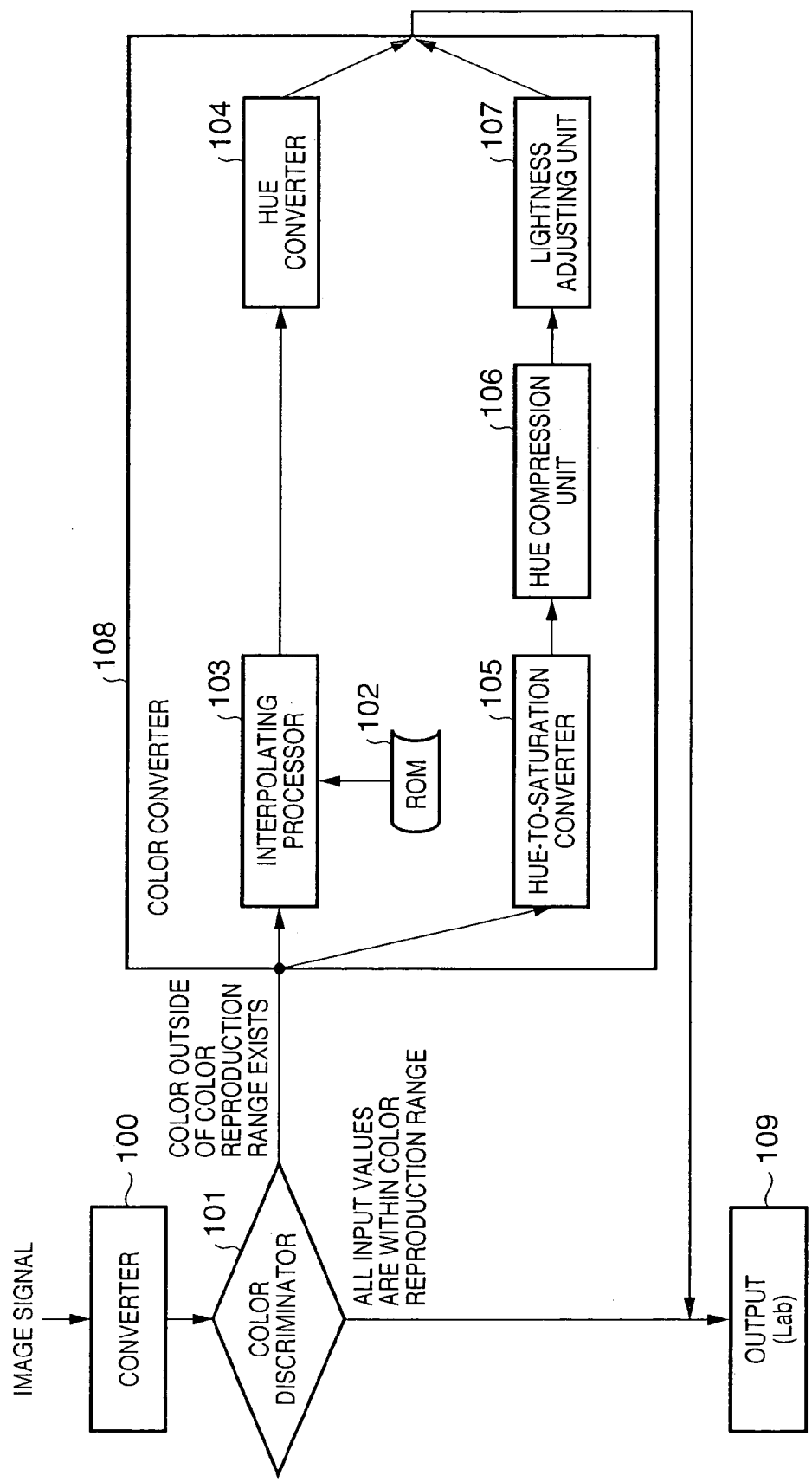
FIG. 1 is a block diagram for describing one example of an image processing apparatus according to an embodiment of the present invention.

FIG. 1 is a block diagram for describing an example of an image processing apparatus according to this embodiment. A signal input to the image processing apparatus shown in FIG. 1 is an image signal of a photographic image in color space that is dependent upon the device. The image signal may be an RGB signal or CMYK signal.

In FIG. 1, a converter 100 converts the entered image signal to a signal in standard color space that is device-independent. This embodiment will be described using a uniform color space, which is represented by L*a*b*, as the standard color space.

A color discriminator 101 determines whether a signal in device-independent color space obtained via the converter 100 falls entirely within the color space of a hard copier or does not fall even partially within this color space. The color discriminator 101 outputs the signal as is if it falls entirely within this color space. If the signal does not fall even partially within this color space, the color discriminator 101 applies the signal to a color converter 108, described later.

Figure 2:
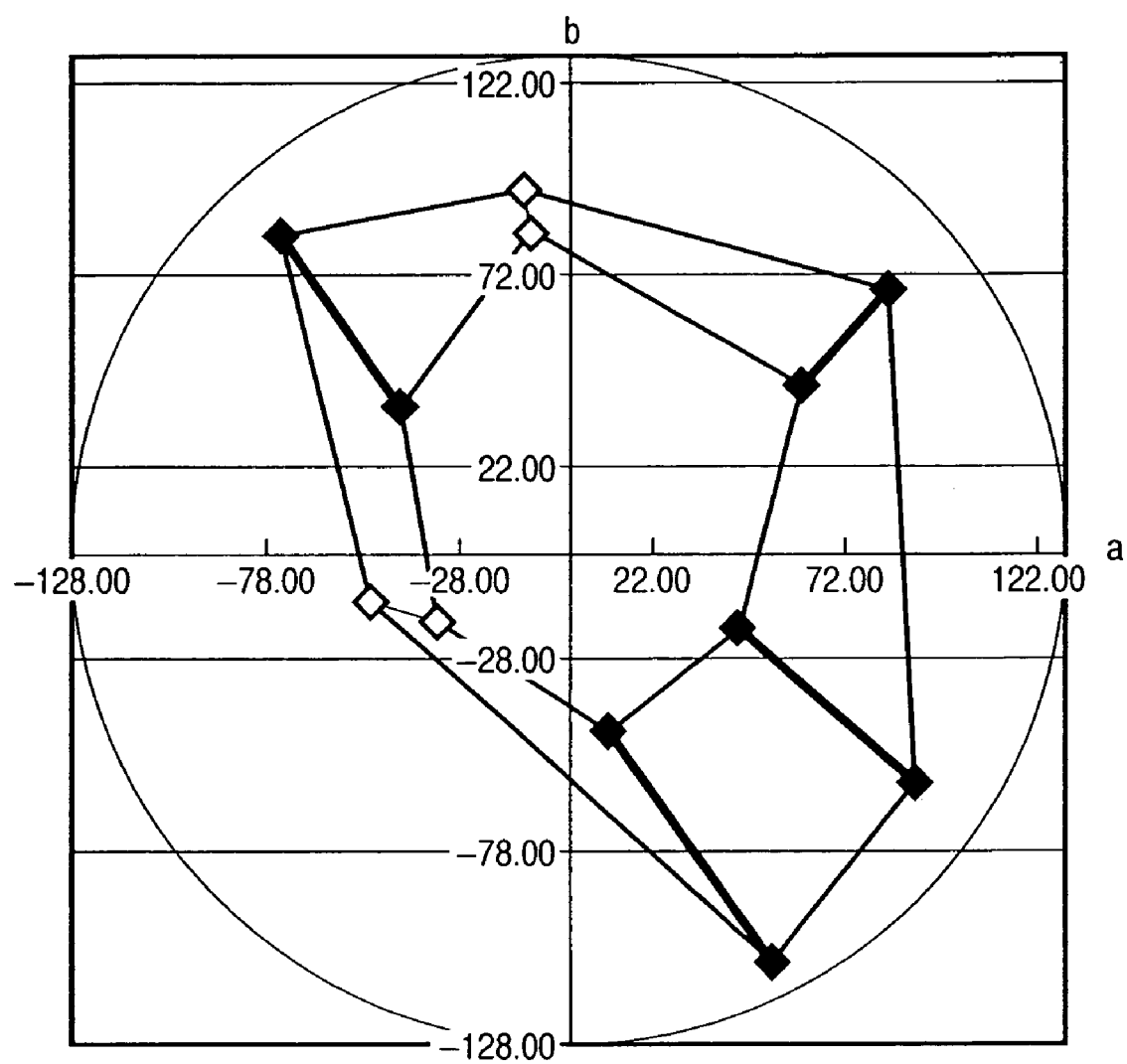
FIG. 2 is a diagram illustrating the relationship between six basic colors and their target colors.

Ordinarily, the color reproduction range of a monitor is greater than that of a printer (hard copier), as shown in FIG. 2, and therefore the signal is processed in the color converter 108.

The structure of the color converter 108 will now be described.

As shown in FIG. 1, the color converter 108 includes a ROM 102 storing data, namely a Lab value obtained by mapping to a certain Lab value. For example, if the original signal is an RGB signal of the kind used in a monitor, then the color is a target color in a certain hard copier, where the color corresponds to a representative color of a value obtained by converting the RGB signal to a Lab value. Representative colors are bright CMYRGB or dark CMYRGB in addition to the six basic colors of CMYRGB.

FIG. 2 is a diagram illustrating the relationship between six basic colors and their target colors. In FIG. 2, input values are on the outer side and target colors are on the inner side. Even if colors are the same, the hue curves will differ if the lightnesses differ. Therefore, by adding on bright CMYRGB or dark CMYRGB data in addition to the six basic colors of CMYRGB of average lightness, target colors can be set more finely.

Data that has been stored in the ROM 102 as representative color is limited by the storage capacity of the ROM. Therefore, with respect to any Lab value, it is required that an interpolating processor 103 interpolate data that has been read out of the ROM 102. The interpolation processing executed by the interpolating processor 103 will be described.

First, let C' denote the target color of a representative color C. A hue that passes through C and a hue that passes through C' are found by interpolation from data in which the hues of Munsell hues have been corrected to Lab values. Ordinarily, with regard to Munsell data, lightness is plotted every 10 units and hue data at each lightness is obtained every 10 units. This will be described taking as an example a case where the lightness of an input value is assumed to be 57. Since lightness is 57 (50<57<60), interpolation is performed from two hue curves, namely a hue curve which prevails when lightness is 50 and a hue curve which prevails when lightness is 60.

Figure 3:
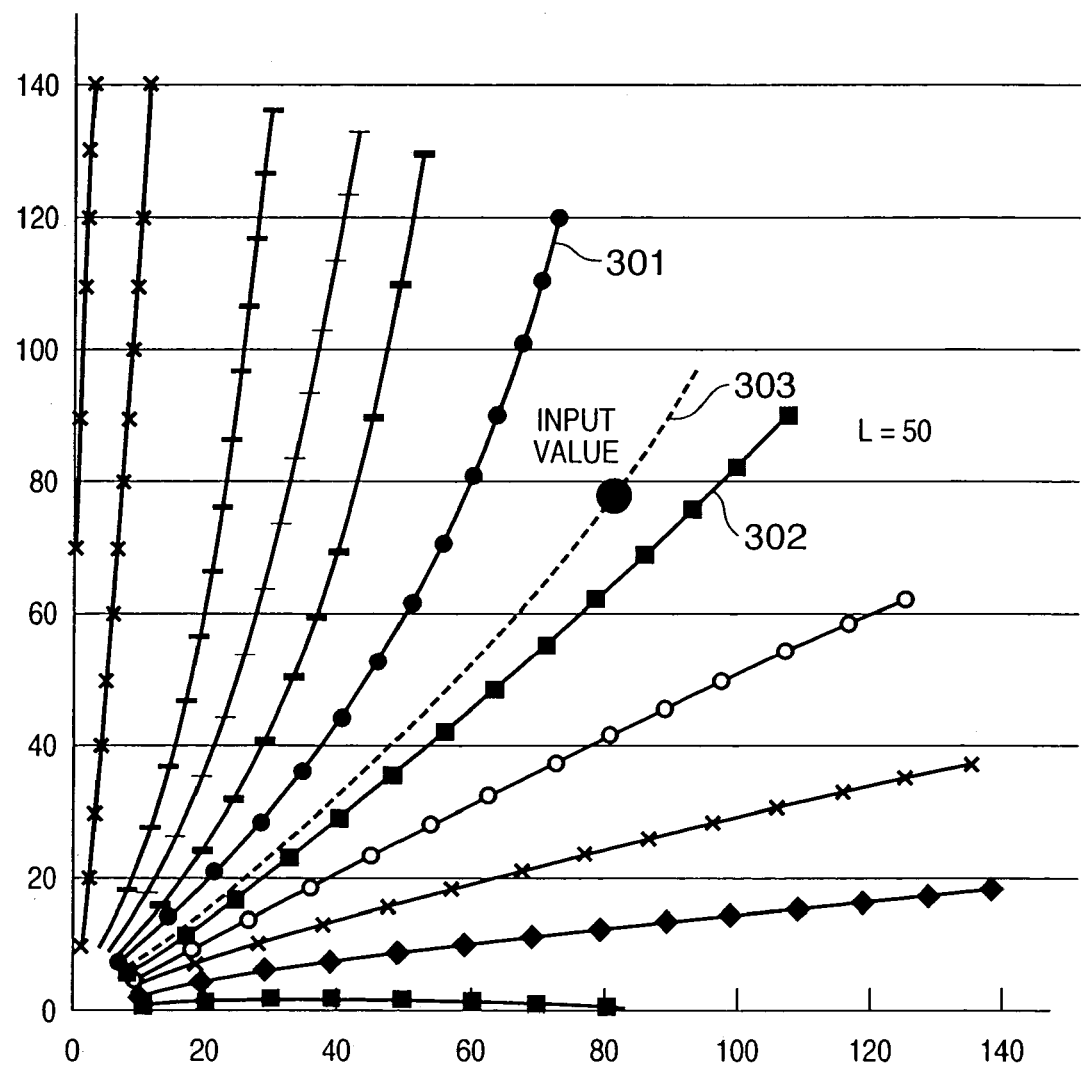
FIG. 3 is a diagram illustrating an ab plane in Lab color space in which lightness is fixed at 50.
Figure 4:
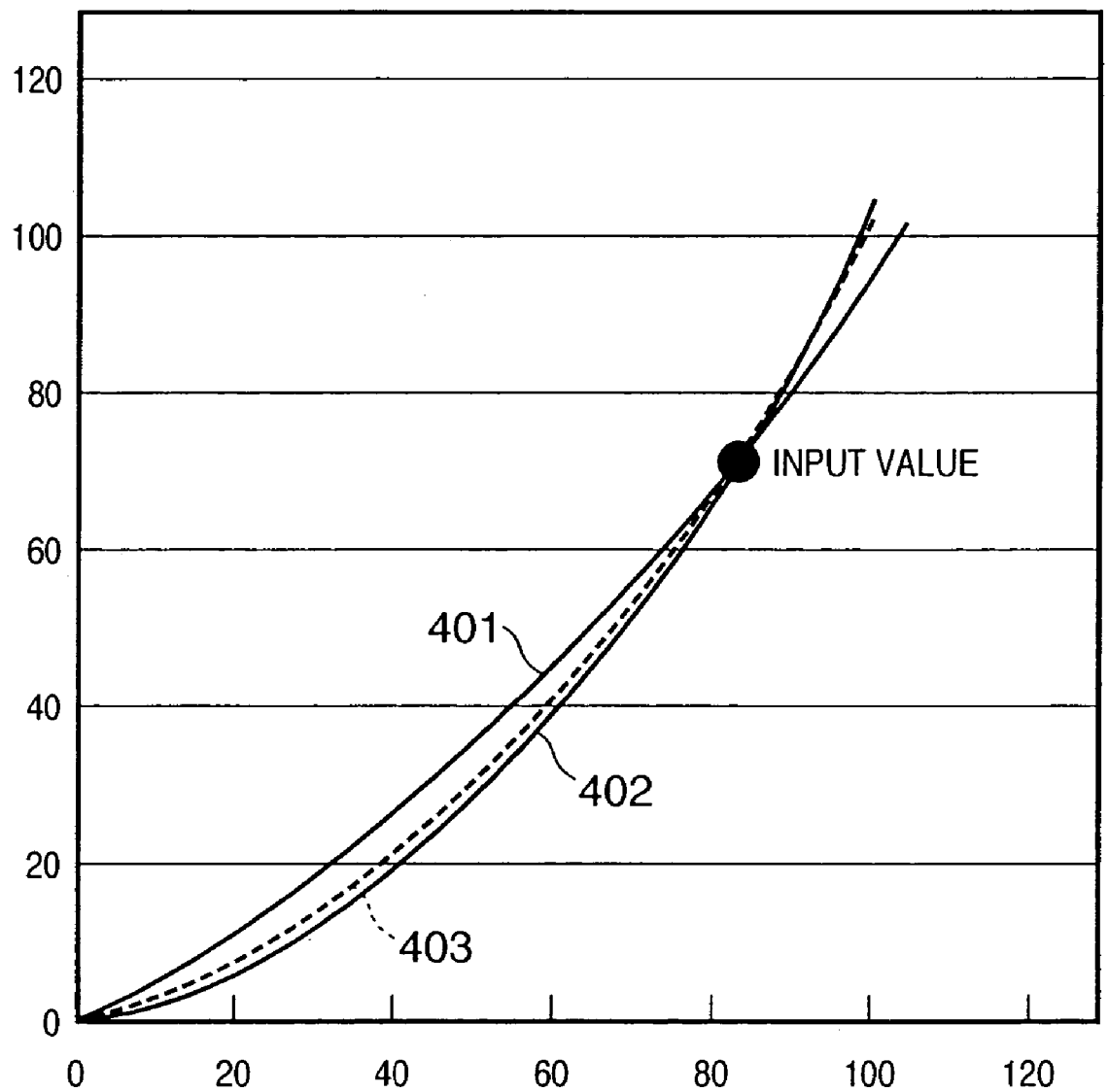
FIG. 4 is a diagram useful in describing processing for performing weighting from hue curves 401 and 402 that pass through an input value prevailing when lightness is 50 and 60, respectively.

First, as shown in FIG. 3, consider a limitation solely to the ab plane of Lab space, where lightness if fixed at 50. Here it is possible to generate a hue curve 303, which passes through an input value, from two hue curves 301, 302 that bracket the input value. A hue curve is generated similarly also when lightness if 60. As shown in FIG. 4, weighting is performed from a hue curve 401, which passes through the input value when lightness is 50, and a hue curve 402, which passes through the input value when lightness is 60, and a hue curve that prevails when lightness if 57 is generated. As a result, a hue that passes through the representative color C and a hue that passes through the target color C' of the representative color C are obtained.

Through a similar method it is possible to find hues that pass through all representative colors and hues that pass through the target colors of the representative colors.

Described next will be processing for compressing any point X. This is executed by a hue converter 104 shown in FIG. 1.

Figure 5:
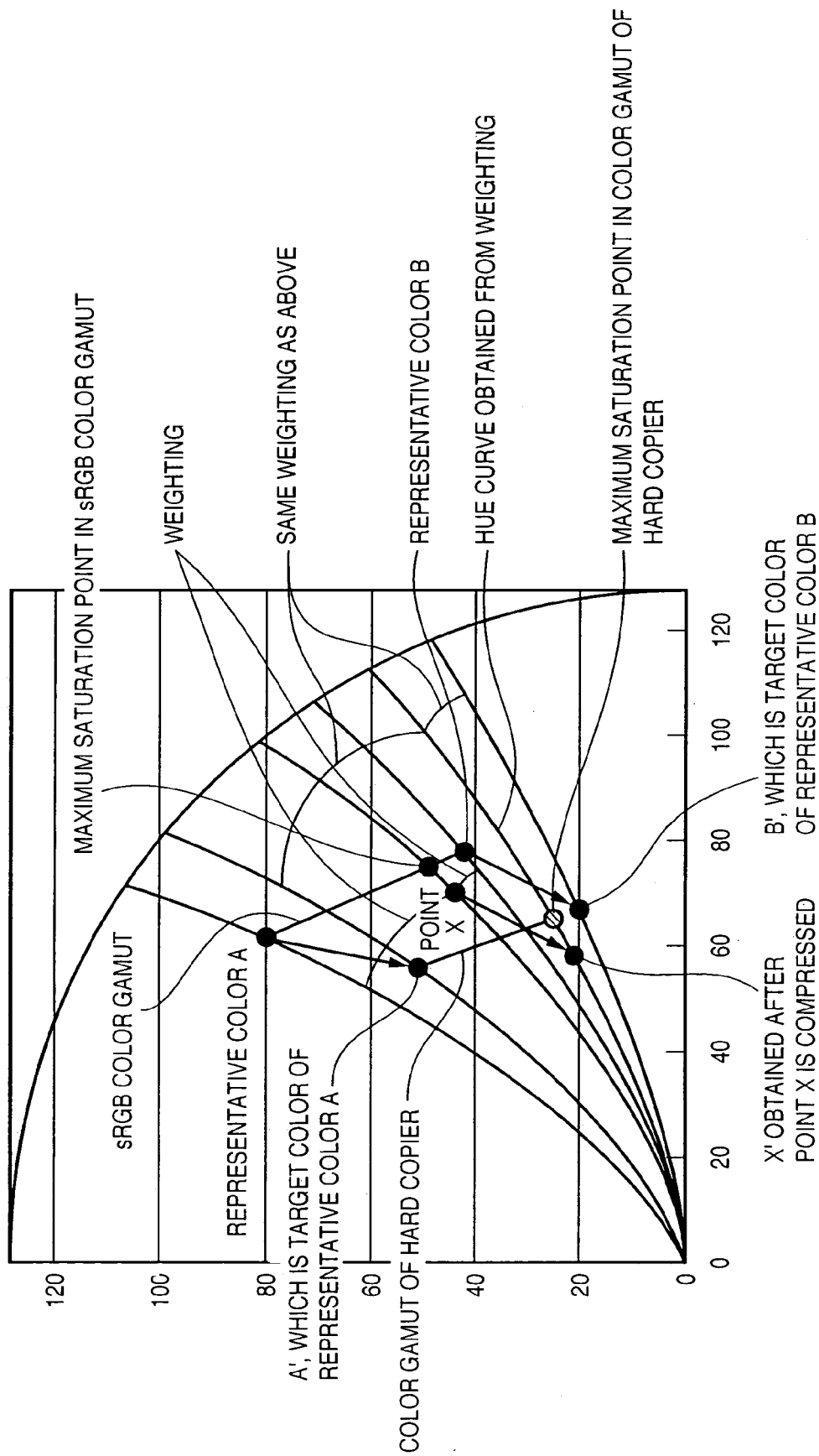
FIG. 5 is a diagram useful in describing a compression method according to this embodiment.

FIG. 5 is a diagram useful in describing a compression method according to this embodiment. As shown in FIG. 5, a point B that is closest to a point X in terms of color difference is selected from among representative points and a hue that passes through the point B is drawn. Next, from among representative colors on the side opposite point B and bracketing the point X, the nearest representative color A is selected and a hue that passes through the point A is drawn in similar fashion. Among the hues passing through the two selected representative colors A, B and the hue passing through the point X, weighting is performed as to the extent that two hues each contribute based upon the vertical positional relationship in the plane. Further, the saturation rate possessed by point X with respect to the maximum saturation of the sRGB color gamut is found from the following equation:

saturation rate=saturation at point X÷(saturation of point of intersection between hue curve passing through point X and sRGB color gamut)   (1)

Next, the hues passing through the two target colors of the selected representative colors are drawn. In FIG. 5, there is a hue curve that passes through a target color A' and a hue curve that passes through a target color B'. On the basis of these two hue curves, an interpolated hue is drawn in a manner similar to that above where weighting was applied. This becomes a hue curve that passes through a point where the point X is compressed. Since the color reproduction range for the hue curve obtained and that for the hue curve that passes through the point X are different, the points of highest saturation are made to correspond in the color space to which each of these hues belongs. Since the input value is originally any Lab value, in this embodiment the description is limited to the sRGB color gamut.

The intersection between the hue curve obtained by weighting and the color gamut of the hard copier is the maximum saturation point in the color gamut of the hard copier.

The saturation rate obtained from Equation (1) earlier is applied to this point. A point that satisfies [(saturation at maximum saturation point in color gamut of hard copier)× (saturation rate)] is a compression point on the hue curve obtained by weighting.

A hue-to-saturation converter 105 shown in FIG. 1 converts a, b signals to a hue signal H and saturation signal C according to Equations (2) below.

$$H = \tan^{-1}(b/a)$$
$$C = \sqrt{(a^2 + b^2)} \quad (2)$$

Using the hue signal H and saturation C obtained by the conversion, a hue compression unit 106 compresses the lightness range of the monitor to the lightness range of the hard copier, after which a lightness adjusting unit 107 adjusts lightness in the vicinity of maximum saturation of the monitor to lightness in the vicinity of maximum saturation of the hard copier. Here compression linearly in the direction of saturation is applied, using the above-mentioned hue, to the data that has undergone lightness adjustment. According to the above processing, it is possible to realize color space compression by linear transformation taking the balance of a plurality of hues adjacent to any point X and saturation into consideration.

In accordance with this embodiment, an input color signal capable of being reproduced by a hard copier is reproduced faithfully. With regard to an input color signal that cannot be reproduced by the hard copier, color-space compression processing that is based upon the tint of an input color signal is applied to this input signal, thereby making it possible to reproduce the signal.

Accordingly, an input color signal within a color reproduction range reproduces color faithfully. An input color signal that is outside the color reproduction range can be reproduced as a color that appears closest to the input color when viewed by a human being.

Modification

In the above embodiment, a linear color-space compression method is used as the color-space compression method. However, this does not impose a limitation upon the present invention and it is permissible to use another color-space compression method such as fringe color-space compression.

Further, according to this embodiment, the input side is the Lab value of a monitor. However, color reproduction range merely widens even in case of any Lab value that is wider than this, and the objective is a target point from a point of maximum saturation of the hue that passes through this Lab value. Any Lab value, therefore, may be used.

In this embodiment, L*a*b* color space is used as the standard color space. However, it is permissible to use another color space, such as L*u*v* color space or YIQ color space.

Further, it will suffice if the hard copier (printer) is an image forming apparatus such as a laser printer or ink-jet printer. Furthermore, the printer may employ a head of the type that discharges ink droplets by using thermal energy to produce film boiling.

Further, the color signal may be input not only from an external device but also from a reader of a CCD or the like with which the apparatus is provided.

Figure 6:
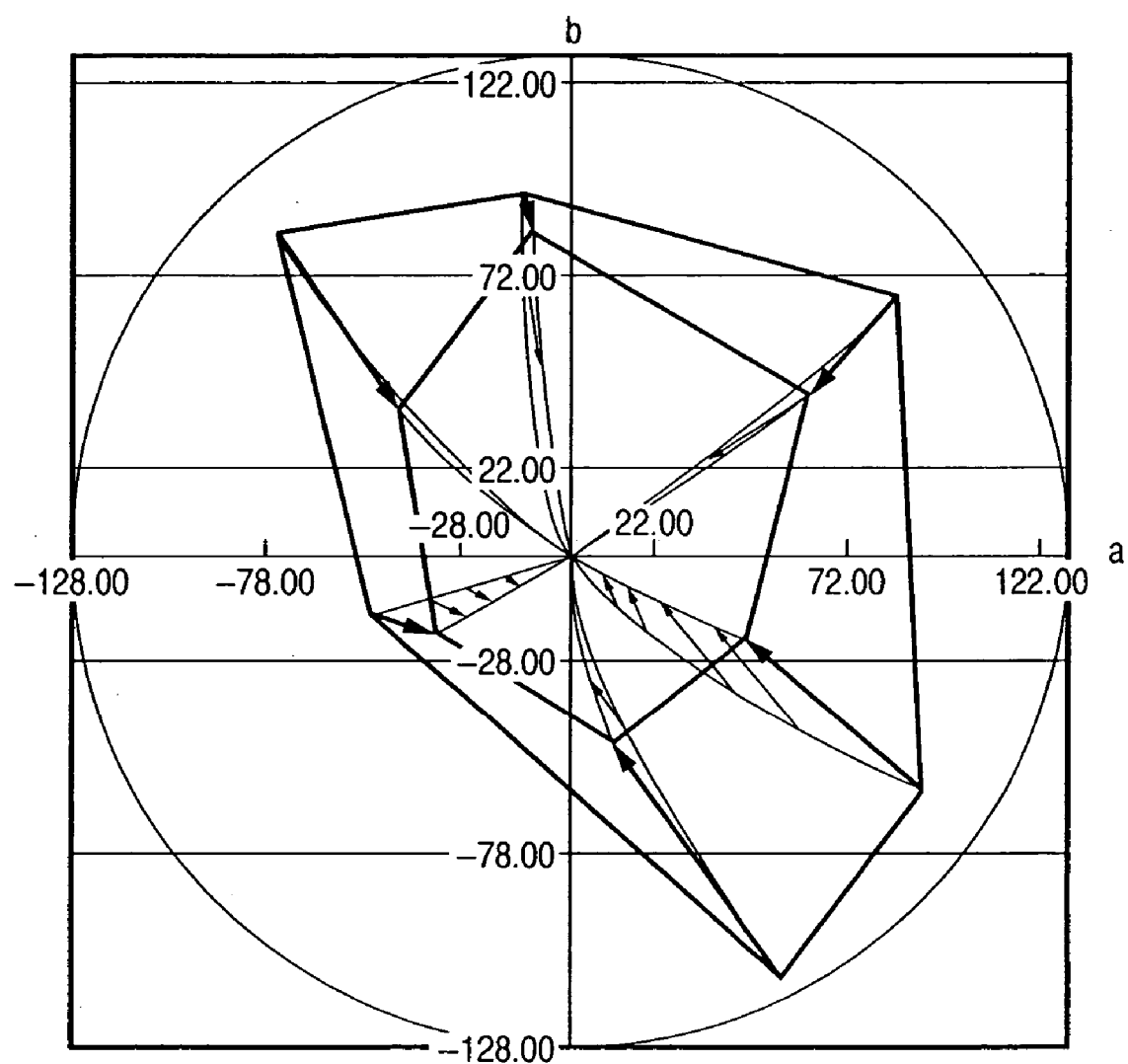
FIG. 6 is a diagram illustrating a color-space compression processing method according to this embodiment.
Figure 7:
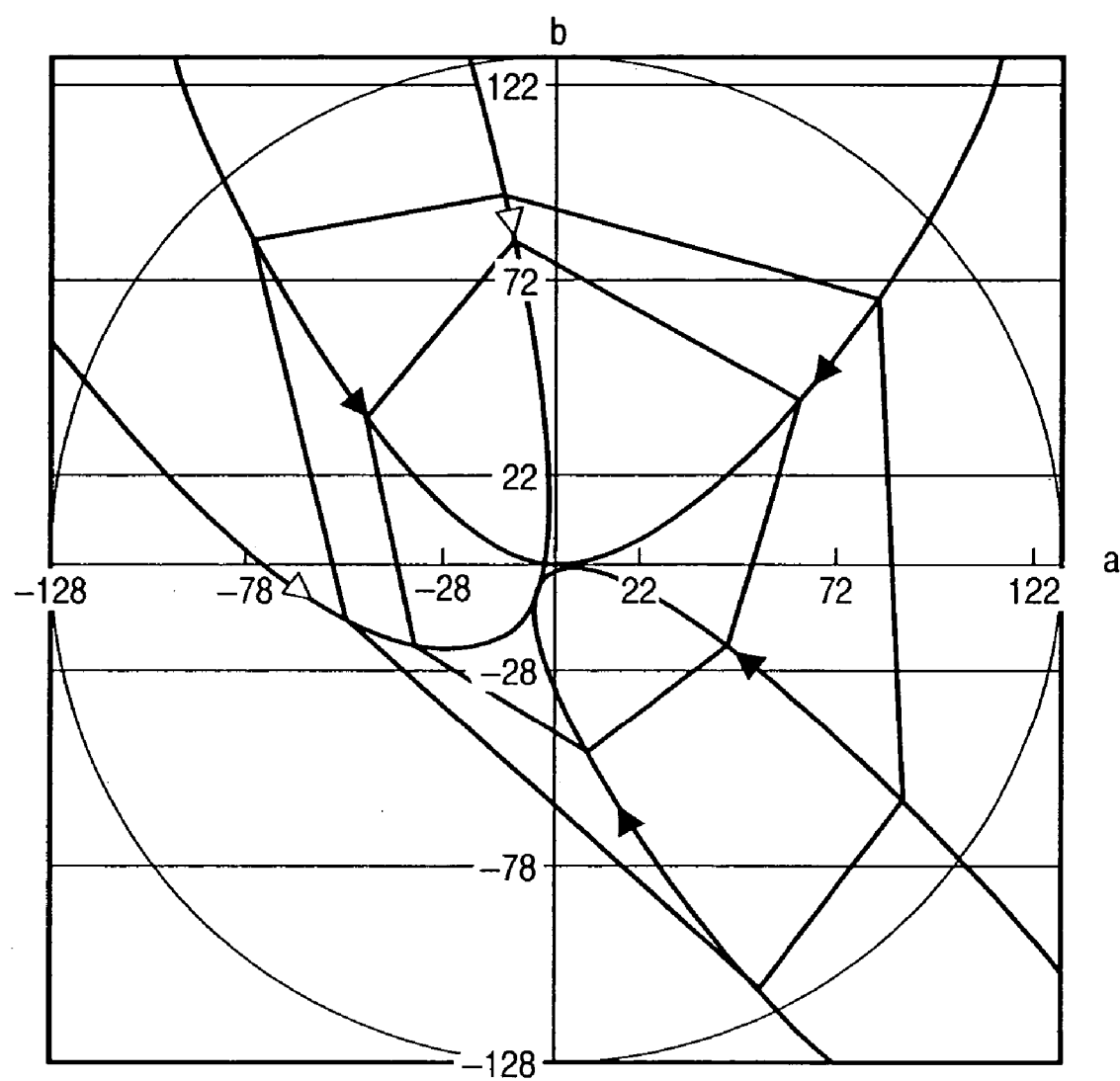
FIG. 7 is a diagram illustrating a compression processing method for compressing saturation on the same hue according to the prior art.

Thus, in accordance with the embodiment as described above, color-space compression processing for color-space compression from a hue system in a broad color space to a hue system in a narrow color space is executed using data that is based upon the characteristics of human vision, as shown in FIG. 6. In comparison with the conventional method of FIG. 7 for compressing saturation in terms of the same hue, the present invention makes it possible to effect a conversion to a color signal indicating a color that appears close to the color indicated by the input signal color.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiment to a system or an apparatus, reading the program codes with a computer (e.g., a CPU or MPU) of the system or apparatus from the recording medium, and then executing the program codes.

In this case, the program codes read from the recording medium implement the novel functions of the embodiment and the recording medium storing the program codes constitutes the invention.

Examples of recording media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the recording medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, in accordance with the present invention, as described above, color-space compression processing is executed based upon the characteristics of human vision and a conversion is made to a color signal representing a color having an appearance close to a color expressed by an input color signal.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for converting an input color signal of a first color space to a color signal of a second color space having a color reproduction range narrower than that of the first color space, comprising:

a discriminating step of discriminating whether a color signal that is outside the color reproduction range of the second color space having the color reproduction range narrower than that of the first color space exists within the input color signal of the first color space; and a color converting step of converting the hue system of the color signal represented in the first color space to the hue system of the color signal represented in the second color space having the narrower color reproduction range in a case where it has been discriminated at said discriminating step that a color signal outside the color reproduction range of the second color space exists, wherein said color converting step includes converting a non-linear conversion to a linear conversion by separately obtaining a hue system before conversion and a hue system after conversion.

2. The method according to claim 1, wherein said color converting step includes linearly converting the hue system of the input color signal based upon maximum saturation in the first color space and maximum saturation in the second color space.

3. The method according to claim 1, further comprising a step of storing a plurality of target colors in the second color space corresponding to a plurality of representative colors in the first color space and executing color-space compression in accordance with the stored plurality of target colors and the input color signal.

4. The method according to claim 3, wherein processing for the color-space compression is color-space compression processing of a photographic-tone image.

5. The method according to claim 1, further comprising a step of converting the input color signal to a color signal in a standard color space and extracting hue and saturation based upon the color signal in the standard color space.

6. The method according to claim 5, wherein the standard color signal is a color signal represented by uniform color space.

7. The method according to claim 5, wherein the uniform color space is a set of points including a prescribed color space and having any color-signal values.

8. An image processing apparatus for converting an input color signal of a first color space to a color signal of a second color space having a color reproduction range narrower than that of the first color space, comprising:

discriminating means for discriminating whether a color signal that is outside the color reproduction range of the second color space having the color reproduction range narrower than that of the first color space exists within the input color signal of the first color space; and color converting means for converting the hue system of the color signal represented in the first color space to the hue system of the color signal represented in the second color space having the narrower color reproduction range in a case where it has been discriminated by said discriminating means that a color signal outside the color reproduction range of the second color space exists, wherein said color converting means convert a non-linear conversion to a linear conversion by separately obtaining a hue system before conversion and a hue system after conversion.

9. A computer-readable medium storing a computer program for causing a computer to function as each of the means of the image processing apparatus set forth in claim 8.

10. A computer-readable medium storing a computer program for causing a computer to execute each step of the image processing method set forth in claim 1.

* * * * *